UNITED STATES PATENT OFFICE.

WALTER E. F. BRADLEY, OF PIERMONT, NEW YORK.

PRODUCTION OF CARBON.

1,426,144.  Specification of Letters Patent.  Patented Aug. 15, 1922.

No Drawing. Application filed September 4, 1918, Serial No. 252,586. Renewed June 15, 1922. Serial No. 568,584.

*To all whom it may concern:*

Be it known that I, WALTER E. F. BRADLEY, a resident of Piermont, county of Rockland, State of New York, have invented certain new and useful Improvements in the Production of Carbon, of which the following is a specification.

The invention relates to the production of extremely pure and finely divided carbon, such as lamp black. The object of the invention is mainly to obtain such a product cheaply and economically in a high degree of purity and without the use of complicated apparatus.

The improved process according to the present invention may be carried out for example as follows:

A stream of hydrocarbon gas such as methane or natural gas is passed through or over finely divided heated iron oxide such as the magnetic oxide $Fe_3O_4$, maintained at a temperature of about 1,000° C. with exclusion of air. The hydrocaron gas is thereby dissociated and carbon in finely divided and substantially pure form is deposited upon the iron oxide. I have found that after two hours of treatment in this way, the iron oxide is not reduced to metal to any substantial extent and that the weight of the deposited carbon is greater than that of the iron oxide upon which it has been deposited. At a temperature of 800° C. a small yield of pure carbon is obtained, but the yield becomes greater as the temperature is increased. The temperature of course must be maintained by supplying heat to make up the heat losses and chemical heat units absorbed.

Having obtained the carbon in the form of a deposit, the mixture may then be subjected to any suitable treatment for removing the carbon from the iron oxide. This may be done, for example, by means of magnetic separators or chemical or mechanical treatment. The carbon should not be exposed to air while at a high temperature, and therefore either the mixture should be cooled out of contact with air before separation, or the separated carbon should be cooled before being exposed to the air. The mixture may, however, be employed for example in metallurgical processes, without previous cooling or separation, such use being more fully described and claimed in my copending application Sr. No. 252,587 and not forming in itself a part of the invention claimed in the present application.

I claim:

1. The method of producing carbon, which comprises passing a hydrocarbon gas into contact with iron oxide at a temperature in the neighborhood of 800° C. to 1,000° C. with exclusion of air.

2. The method of producing carbon which comprises passing a hydrocarbon gas into contact with iron oxide at a temperature in the neighborhood of 800° C. to 1,000° C. with exclusion of air, and removing the resulting deposit of carbon from the iron oxide.

3. The method of producing carbon, which comprises passing a hydrocarbon gas into contact with iron oxide at a temperature in the neighborhood of 800° C. to 1,000° C. with exclusion of air, cooling the resulting mixture of iron oxide and carbon out of contact with air, and separating the carbon from the iron oxide.

4. The method of producing carbon which comprises heating magnetic oxide of iron to a temperature in the neighborhood of 800° C. to 1,000° C. and passing natural gas into contact therewith while maintaining the temperature and excluding air.

5. The method of producing carbon, which comprises heating magnetic oxide of iron to a temperature around 800° C. to 1,000° C., passing natural gas into contact with the hot oxide of iron while excluding air, and separating the deposited carbon from the oxide of iron.

6. The method of producing carbon which comprises heating magnetic oxide of iron to a temperature in the neighborhood of 1000° C., passing natural gas into contact therewith while excluding air, cooling the resulting mixture of carbon and oxide of iron while excluding air, and separating the carbon from the magnetite.

WALTER E. F. BRADLEY.